United States Patent
Yoshikawa

(10) Patent No.: US 7,141,526 B2
(45) Date of Patent: Nov. 28, 2006

(54) EXHAUST GAS PURIFYING CATALYST AND PROCESS FOR PURIFYING EXHAUST GAS BY USE OF THE CATALYST

(75) Inventor: Tatsuya Yoshikawa, Himeji (JP)

(73) Assignees: ICT Co., Ltd., Osaka (JP); International Catalyst Technology, Inc., Auburn Hills, MI (US)

( * ) Notice: Subject to any disclaimer, the term of this patent is extended or adjusted under 35 U.S.C. 154(b) by 156 days.

(21) Appl. No.: 10/824,677

(22) Filed: Apr. 15, 2004

(65) Prior Publication Data

US 2004/0209760 A1    Oct. 21, 2004

(30) Foreign Application Priority Data

Apr. 17, 2003   (JP) ............................... 2003-112988

(51) Int. Cl.
*B01J 29/068* (2006.01)
*B01J 29/44* (2006.01)

(52) U.S. Cl. ................. 502/74; 502/77; 423/213.5; 423/239.2

(58) Field of Classification Search ............ 423/239.2, 423/213.5; 502/74, 77
See application file for complete search history.

(56) References Cited

U.S. PATENT DOCUMENTS

| 5,330,732 | A |   | 7/1994 | Ishibashi et al. ......... 423/213.2 |
| 5,733,837 | A | * | 3/1998 | Nakatsuji et al. ........... 502/304 |
| 5,762,892 | A |   | 6/1998 | Kasahara et al. ........ 423/213.5 |
| 2001/0053340 | A1 |   | 12/2001 | Noda et al. .............. 423/213.2 |

FOREIGN PATENT DOCUMENTS

| JP | 10-156144 | 6/1998 |
| JP | 11-90235 | 4/1999 |
| WO | WO 01/37978 | 5/2001 |
| WO | WO 03/045547 | 6/2003 |

\* cited by examiner

*Primary Examiner*—David Sample
(74) *Attorney, Agent, or Firm*—Fish & Richardson P.C.

(57) ABSTRACT

An exhaust gas purifying catalyst characterized by having zeolite subjected to ion exchange with cerium and deposited on cerium oxide as well and containing platinum and/or palladium, and a process for purifying the exhaust gas using the catalyst. The catalyst, by using zeolite and a noble metal, is enabled to acquire improved durability.

12 Claims, No Drawings

EXHAUST GAS PURIFYING CATALYST AND PROCESS FOR PURIFYING EXHAUST GAS BY USE OF THE CATALYST

BACKGROUND OF THE INVENTION

1. Field of the Invention

This invention relates to a catalyst for purifying an exhaust gas discharged mainly from a diesel engine and a process for purifying the exhaust gas using the catalyst. More specifically, this invention relates to a catalyst capable of efficiently purifying nitrogen oxides (NOx), which are generally difficult of purification in an excess oxygen atmosphere, and manifesting durability, and a process for purifying NOx using the catalyst.

2. Description of Related Art

In the global trend toward rising consciousness of environmental conservation and strengthening emission control, cars equipped with a diesel engine of high fuel efficiency have been reevaluated throughout the world particularly in Europe. The reduction of NOx emission which is one of the harmful components in the exhaust gas of diesel engines has turned into a subject.

In an oxygen rich environment like the exhaust gas of diesel engines, the decrease of NOx is difficult because an oxidation reaction proceeds on the catalyst. Thus, a technique which promotes reduction of NOx utilizing the unburnt hydrocarbons in the exhaust gases or the fuel as a reductant has been examined.

Since the temperature of exhaust gases from the diesel engine is low as compared with that from the gasoline engine, a noble metal, predominantly platinum, which begins to manifest reactivity at a low temperature in an oxidizing atmosphere (excess oxygen atmosphere), is adopted for decreasing hydrocarbons and carbon monoxide. Meanwhile, NOx reduction catalyst which uses hydrocarbon as the reductant, platinum has been cited as a catalytically active component. In such circumstances, many catalysts composed of zeolite and platinum have been proposed as described, for example, in U.S. Pat. No. 5,330,732, U.S. Pat. No. 5,762,892, JP-A-10-156144, and JP-A-11-90235.

SUMMARY OF THE INVENTION

A conventional NOx purifying exhaust gas catalyst, composed of platinum and zeolite, deteriorates severely after endurance running, then cause the increase of catalyst activation temperature and consequently the reduction of purification efficiency. It is, therefore, necessitates to increase the addition amount of the reductant for maintaining the activity, and not so economical.

An object of this invention, therefore, is to provide a catalyst which is capable of maintaining the activity thereof from the initial stage to the endurance running as compared with the conventional catalyst, and a process for purifying exhaust gases using the catalyst.

I, as a result of a diligent study concerning catalysts containing zeolite and platinum, have found that a catalytic composition obtained by replacing part of zeolite by ion exchange with cerium and depositing cerium oxide thereon as well and further replacing the resultant zeolite by ion exchange with a noble metal, such as platinum, exhibits a high initial activity and maintains high activity even after endurance running, as compared with the conventional catalyst. This invention has been achieved.

Namely, this invention concerns a catalyst for purifying exhaust gases, characterized by comprising a zeolite ion exchanged with cerium and deposited with cerium oxide as well together with at least one member selected from the group consisting of platinum, palladium and mixtures thereof.

Further, this invention concerns a process for purifying exhaust gases emanating from a diesel engine using the catalyst mentioned above.

In accordance with the present invention, it can provide an exhaust gas purifying catalyst excellent in durability as compared with the conventional catalyst, and a process for purifying the exhaust gas using the catalyst. Specifically, in the exhaust gas from the diesel engine, this catalyst is capable of efficiently purifying NOx.

DESCRIPTION OF THE PREFERRED EMBODIMENT

Now, this invention will be described in detail below.

The zeolite which is used in this invention is an aluminosilicate, though a hydrogen ion, the ion of an alkali metal, such as sodium, or the ion of an alkaline earth metal, such as magnesium, can be used as a compensating ion. It is nevertheless preferred to be a proton type or an ammonium ion type zeolite. Generally, this composition may be a mixture of ZSM5 zeolite as a main component with other zeolite species such as mordenite, beta, faujasite (X, Y type), offretite, ferrierite, erionite, chabazite, and A type. The mixing ratio of these components is such that the ZSM5 zeolite content may be at least 60% by weight and preferably in the range of 70–100% by weight and more preferably in the range of 80–100% by weight, based on the total weight of the mixture. In this case, the molar ratio of $SiO_2/Al_2O_5$ in the ZSM5 zeolite is generally in the range of (1–100)/1 and preferably of (10–70)/1. The reason for this range is that the catalyst is enabled to manifest the ability to purify fully satisfactorily and maintain the durability.

The zeolite is subjected to ion exchange with cerium and deposited with cerium oxide as well. In this state, the ion exchanged cerium exists at least in the backbone of the zeolite, namely near the aluminum contained in the zeolite, after the preparation of the catalyst the deposited cerium oxide exists on the outer surface of zeolite. The expression "ion exchanged cerium" as used herein refers to the cerium adhered to the treated zeolite that a zeolite is contacted with an aqueous solution of cerium ion, wherein replacement by ion exchange takes place, and after washing with water, the cerium continues to adhere to the zeolite. The ion exchange may be performed to part or all of the zeolite which allow ion exchange to take place. Then, the expression "allow ion exchange partly (with cerium)" as used herein refers to the fact that part of the ion exchange sites existing in the zeolite is filled with cerium ions. Further, the zeolite may be subjected to ion exchange with a noble metal such as platinum, and palladium. In this case, the noble metal eventually exists in the backbone of zeolite, namely near the aluminum contained in the zeolite.

Generally, the amount of the cerium to be ion exchanged for zeolite is affected by factors such as the number of ion exchange sites, the pore diameter of zeolite, and the conditions during the course of the ion exchange like temperature and pH. The rate of ion exchanged cerium can be determined by the Al content in the zeolite. Namely, in the case of ZSM5 zeolite, the Ce/Al molar ratio is preferably not exceeding 0.2/1 and more preferably falling in the range of (0.01–0.15)/1. If the Ce/Al molar ratio exceeds 0.2, the excess will possibly decrease the acid sites on or in the zeolite and consequently degrade the NOx purification ability. Further, the amount of ion exchange is determined by fluorescent X-ray analysis.

The operations of ion exchange and deposition, in the case of the ZSM5 zeolite, may be performed independently or simultaneously. Examples of the starting material for the ion exchange independently, may include water-soluble salts, such as cerium acetate, cerium sulfate, and cerium nitrate. The ion exchange can be performed by a series of operations such as suspending zeolite in an aqueous solution of the starting material, filtering the resultant suspension, washing the filtrate with water, drying the washed filtrate, and calcining the dried filtrate. The operation of deposition is implemented by a separation and precipitation process using the salt mentioned above or cerium sol.

In this invention, however, the operations of ion exchange and deposition can be simultaneously performed on the ZSM5 zeolite conveniently and without sacrifice of the effect of this invention. To be specific, by impregnating the zeolite with a total amount of cerium necessary for the ion exchange and the deposition, drying the impregnated zeolite, and calcining the dried zeolite, the ion exchange and the deposition are substantially performed, thereby part of the cerium is immobilized within the micropores of the zeolite and deposited on the outer surface thereof as well. The salts of cerium which are usable for the ion exchange mentioned above, in particular cerium acetate, may be cited as materials for the cerium. The amount of the cerium oxide to be deposited is preferably in the range of 0.1–3% by weight and more preferably 0.3–2% by weight, based on the weight of zeolite.

A process which subjecting a proton type zeolite to ion exchange with a complex salt, such as $Pt(NH_3)_4(OH)_2$, may be cited as an example for performing ion exchange with a noble metal like platinum. The amount of the noble metal to be deposited is not particularly restricted but may be determined based on the volume and temperature of the exhaust gas to be treated. It is preferably in the range of 0.05–5% by weight and more particularly 0.1–3% by weight, based on the weight of the zeolite.

Generally, the noble metal is added to the cerium-zeolite complex oxide mentioned above. Alternatively, a process of performing ion exchange/deposition of cerium on or in the zeolite which has been subjected to ion exchange with the noble metal in advance may be adopted without lose of the effect of this invention. When a noble metal which has not undergone ion exchange is used as the raw material, a process of depositing the noble metal on the zeolite may be adopted without lose of the substantial effect of this invention. In this case, the immobilization is performed by impregnation, and separation and precipitation, for example. The noble metal to be contained in the catalyst is preferred to be platinum, palladium, or mixtures thereof and particularly preferred to be platinum from the viewpoint of the activity and durability of the catalyst. Rhodium is not favorable because it manifests no sufficient ability to purify NOx in an oxidizing atmosphere. The content of this noble metal in the catalyst is decided depending on the temperature and volume of the exhaust gas to which the catalyst is exposed. It is generally in the range of 0.05–5% by weight and preferably in the range of 0.1–3% by weight, based on the weight of the zeolite.

The catalyst consequently obtained preferably contains 100–400 g of zeolite, 0.5–10 g of cerium oxide, and 0.05–10 g of a noble metal, per liter of the catalyst. Here, the catalyst volume is counted with the volume of honeycomb carrier as described above.

Besides the noble metal mentioned above, at least one element selected from the group consisting of indium, tin, phosphorus, zirconium, and boron may be added to the catalyst in an amount in the range of 0.01–1% by weight, based on the weight of the zeolite. This addition may be effective in improving the catalyst in durability and activity.

Further, an inorganic oxide, such as alumina, zirconia, silica, and titania, may be used in the composition of the catalyst. The inorganic oxide can be applied as follows. An inorganic oxide powder is carried on a monolith carrier, and then the carried monolith carrier is carried with the treated zeolite in which a zeolite is partly ion exchanged with cerium, and deposited with cerium oxide, and then deposited with at least one noble metal selected from the group consisting of Pt, Pd and mixtures thereof. Alternatively, an inorganic oxide powder is intimately mixed with the zeolite composition.

Examples of the integral structure carrier for coating the catalytic component may include a thermostable carrier such as a honeycomb carrier or support. An integrally molded honeycomb carrier, such as a monolithic honeycomb carrier, a metal honeycomb carrier, and a plug honeycomb carrier, proves favorable.

The monolithic carrier may be what is generally called a ceramic honeycomb carrier. The honeycomb carriers made of materials, such as cordierite, mullite, α-alumina, zirconia, titania, titanium phosphate, aluminum titanate, petalite, spodumene, aluminosilicate, and magnesium silicate, are favorable. Among them, cordierite proves particularly advantageous. Integral structure carriers made of a thermostable metal, such as stainless steel and Fe—Cr—Al alloys which exhibit resistance to oxidation, are also available.

These monolithic carriers are produced by extrusion molding or rolling a sheetlike element. The shape of inlets to gas passages (shape of cells) maybe a hexagon, a tetragon, a triangle, or a corrugated form, whichever may best fit the occasion. The cell density (number of cells/unit cross section) may be in the range of 100–600 cells/square inch and preferably of 200–600 cells/square inch.

In this invention, though a process for coating the catalytic component is not particularly restricted, a process of impregnation is generally adopted favorably.

The catalyst contemplated by this invention may be manufactured by the following process. First, a proton type zeolite and an aqueous solution of an organic salt, such as cerium acetate, are mixed, heated as kept stirred at a temperature of 60° C.–90° C. for a period of about 0.5–6 hours, and further concentrated to form a slurry. The produced slurry is dried, for example, at a temperature of 100° C.–150° C. for a period of 1–12 hours, and optionally calcined, for example, at a temperature of 300° C.–700° C. for a period of 0.5–3 hours to obtain a cerium-zeolite composite.

Thereafter, the cerium-zeolite composite and an aqueous solution of a complex salt including a noble metal, such as platinum, are added together, stirred at room temperature, and then filtered. The cake obtained consequently is dried, for example, at a temperature of 100° C.–150° C. for a period of 1–12 hours and calcined, for example, at a temperature of 300° C.–700° C. for a period of 0.5–3 hours to obtain a catalyst composition.

Next, the produced catalyst composition and a binder, such as silica sol, optionally added thereto are wet milled using a ball mill to form a slurry. A refractory integral structure carrier made of cordierite, for example, is impregnated with the resultant slurry and the impregnated carrier is drained to remove excess slurry, then dried at a temperature of 80° C.–250° C., preferably 100° C.–150° C., and optionally calcined at a temperature of 300° C.–800° C., preferably 400° C.–700° C. for a period of 0.5–3 hours, preferably 1–2 hours. When an amount of the catalyst composition to be deposited is required to be increased, the procedure described above may be repeated. When multiple noble metals are used, the aforementioned step of deposition is performed per each noble metal, and, if necessary, is repeated so as to deposit a suitable amount.

The catalyst of this invention is capable of purifying exhaust gases discharged from a diesel engine and containing emission pollutants. Particularly, it is capable of efficiently purifying the exhaust gas of NOx, which would be difficult to remove in an atmosphere of excess oxygen.

EXAMPLES

Now, this invention will be described more specifically with reference to examples. These examples are illustrative of this invention and not limitative of the invention.

Example 1

One thousand (1000) g of a proton type ZSM5 zeolite ($SiO_2/Al_2O_3$, molar ratio: 30) was dispersed in 5 L (liters) of an aqueous cerium acetate solution containing 15 g of cerium oxide. The suspension was heated and stirred in a water bath at 85° C. for three hours, with water added thereto whenever necessary. The heating was further continued for one hour to concentrate the suspension to a slurry state.

The resultant slurry was dried overnight at 120° C. and then calcined in air at 350° C. for two hours to obtain a cerium-zeolite composite. Separately, an aqueous $Pt(NH_3)_4(OH)_2$ solution containing 10 g of platinum and 500 g of the composite dispersed in water medium were stirred together at room temperature for one hour. The resultant mixture was filtered and the cake obtained consequently was dried at 120° C. for five hours and calcined at 500° C. for one hour to obtain Catalyst composition A. As a result of the fluorescent X-ray analysis, this composition A was found to contain 99.5% of the platinum added thereto.

In a ball mill, 500 g of Catalyst composition A, 250 g of a silica sol (solid content: 20.9%), and 1500 g of water added thereto were together milled. A cordierite monolithic carrier having a density of 400 cells/10 mils was coated with the resultant slurry till the amount of the powder deposited reached 200 g/L. The coated carrier was dried at 120° C. for five hours and calcined at 600° C. for one hour to obtain Catalyst 1.

Catalyst 1 thus obtained was found to contain 161.3 g of zeolite, 2.4 g of cerium oxide, 3.2 g of platinum, and 33.1 g of silica, per liter of the catalyst.

Comparative Example 1

In a water medium, 500 g of the zeolite (supra), 7.5 g of cerium oxide (surface area: 95 $m^2/g$), and the aqueous $Pt(NH_3)_4(OH)_2$ solution containing 10 g of platinum were dispersed and stirred together at room temperature for one hour. Thereafter, the resultant mixture was filtered. The cake consequently obtained was dried at 120° C. for five hours and calcined at 500° C. for one hour to obtain Catalyst composition B.

In a ball mill, 500 g of Catalyst composition B, 250 g of silica sol (supra), and 1500 g of water added thereto were together milled. A cordierite monolithic carrier having a density of 400 cells/10 mils was coated with the resultant slurry till the amount of the powder deposited reached 200 g/L. The coated carrier was dried at 120° C. for five hours and calcined at 600° C. for one hour to obtain Comparative catalyst 1.

Comparative catalyst 1 thus obtained was found to contain 161.3 g of zeolite, 2.4 g of cerium oxide, 3.2 g of platinum, and 33.1 g of silica, per liter of the catalyst.

Comparative Example 2

In a ball mill, 500 g of a zeolite which had platinum fixed in advance by ion exchange (containing 10 g of platinum; the zeolite supra), 7.5 g of cerium oxide, 250 g of silica sol (supra), and 1500 g of water added thereto were together milled. A cordierite monolithic carrier having a density of 400 cells/10 mils was coated with the resultant slurry till the amount of the powder deposited reached 200 g/L. The coated carrier was dried at 120° C. for five hours and calcined at 600° C. for one hour) to obtain Comparative catalyst 2.

Comparative catalyst 2 thus obtained was found to contain 161.3 g of zeolite, 2.4 g of cerium oxide, 3.2 g of platinum, and 33.1 g of silica, per liter of the catalyst.

Comparative Example 3

A comparative catalyst 3 was prepared by following the procedure of Comparative Example 2 while omitting the addition of cerium oxide. Comparative catalyst 3 was found to contain 161.3 g of zeolite, 3.2 g of platinum, and 33.1 g of silica, per liter of the catalyst.

Evaluation of Performance

The catalysts obtained as described above, fresh samples and endurance samples, were rated using a diesel engine. The catalysts performance were measured by changing the inlet temperature between 150° C.–450° C. To test for durability, the catalysts were treated at 550° C. (at the inlet of the catalyst) for 40 hours as kept swept with the exhaust gas of the diesel engine. For the rating, light oil of an amount (reduced to $C_1$) three times the NOx concentration was added as a reducing agent. The results are shown in Table 1.

TABLE 1

|  | Maximum degree of conversion of NOx (%) | |
| --- | --- | --- |
|  | Fresh sample | Sample treated at 550° C. |
| Catalyst 1 | 38 | 33 |
| Comparative catalyst 1 | 36 | 25 |
| Comparative catalyst 2 | 36 | 23 |
| Comparative catalyst 3 | 36 | 23 |

(Conditions for Evaluation)
  Diesel engine: Air volume displacement—3.1 L (commercial product)
  Volume of the catalyst: 1.5 L
  Space velocity: About 100,000/hr
  $NO_x$ concentration: 320 ppm
  HC (light oil)/$NO_x$=3 (molar ratio of C (carbon in light oil) to NOx)

It is clear from Table 1 that the effectiveness of the catalyst of this invention is prominent. The role of each component for constructing the present catalyst is considered as follows. The cerium which has undergone ion exchange is retained in the backbone of zeolite and contributed to restrain the collapse of the backbone and restrain the migration of a platinum group element, after the endurance treatment of zeolite, thereby improving the durability of the catalyst. The cerium (oxide) which is deposited on the surface is contributed to promote the oxidation of nitrogen monoxide (NO), thereby promoting the formation of nitrogen dioxide ($NO_2$) at a low temperature and improving the efficiency of purification. Then, the platinum group element performs the combustion of hydrocarbons and the purification of NOx as well.

Ratio of Ion Exchange with Cerium

When a product obtained by ion exchange with cerium was filtered and the filtrate was tested by the fluorescent X-ray analysis to determine the cerium content in zeolite in the same manner as in Example 1, about 10% of the charged cerium was estimated as that by ion exchange.

It is clear from the foregoing results that the catalyst, which contains zeolite partly subjected to ion exchange with cerium (and platinum) and cerium oxide (and platinum) deposited on zeolite, is effective in purifying NOx contained in the exhaust gases from a diesel engine in the presence of a reductant (unburnt-hydrocarbon, light oil, etc.).

The entire disclosure of Japanese Patent Application No. 2003-112988 filed on Apr. 17, 2003 including specification, claims and summary are incorporated herein by reference in its entirety.

What is claimed is:

1. A catalyst for purifying exhaust gases, comprising:
    a zeolite ion exchanged with cerium and deposited with cerium oxide together with one member selected from the group consisting of platinum, palladium and a mixture thereof;
    wherein a weight ratio of cerium oxide calculated based on the total amount of the cerium in the catalyst to the zeolite is in the range of 0.1–3% by weight based on the weight of the zeolite.

2. A catalyst according to claim 1, wherein the zeolite has been subjected to ion exchange with at least one member selected from the group consisting of platinum, palladium and mixtures thereof.

3. A catalyst according to claim 2, wherein an amount of the member is in the range of 0.05–5% by weight, based on the weight of the zeolite.

4. A catalyst according to claim 1, wherein at least 60% by weight of the zeolite is a ZSM-5 type zeolite and a molar ratio of $SiO_2/Al_2O_3$ thereof is in the range of 1–100/1.

5. A catalyst according to claim 1, wherein the zeolite is at least one member selected from he group consisting of ZSM-5 zeolite, mordenite, beta, faujasite, offretite, ferrierite, erionite, chabazite, A type, and mixtures thereof.

6. A catalyst according to claim 1 further comprising at least one additive selected from the group consisting of indium, tin, phosphorus, zirconium, boron, and mixtures thereof.

7. A catalyst according to claim 6, wherein an amount of the additive is in the range of 0.01–1% by weight, based on the weight of the zeolite.

8. A catalyst according to claim 1, wherein the catalyst is deposited on an integral structure carrier.

9. A catalyst according to claim 8, wherein the integral structure carrier is a honeycomb carrier.

10. A catalyst according to claim 8, wherein the catalyst contains 100–400 g of zeolite, 0.5–10 g of cerium oxide, and 0.05–10 g of a noble metal, per liter of the catalyst.

11. A catalyst according to claim 1, wherein the catalyst is obtainable from carrying a cerium ion on a zeolite by ion exchange, depositing cerium oxide on the carried zeolite, and depositing on the resultant zeolite at least one member selected from the group consisting of platinum, palladium and mixtures thereof.

12. A process for purifying an exhaust gas discharged from a diesel engine which comprises contacting the gas with the catalyst set forth in claim 1.

* * * * *